April 16, 1929.   N. SCHACHTMEYER ET AL   1,709,687
REGULATOR SYSTEM
Filed April 23, 1926
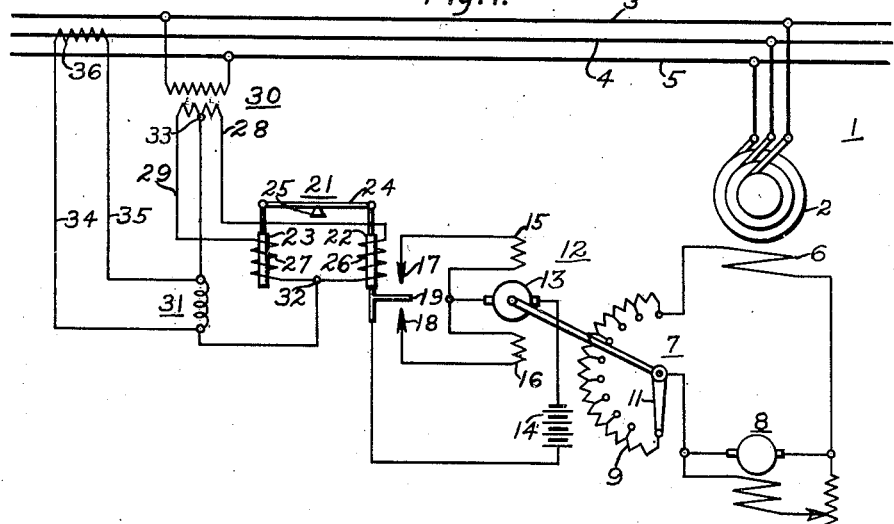
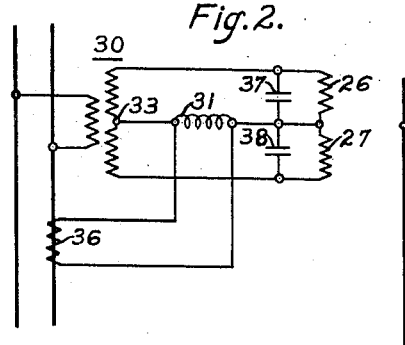
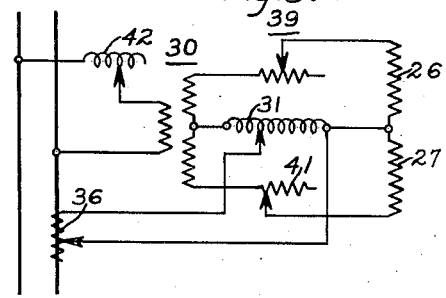
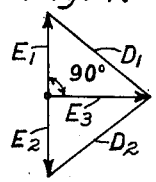
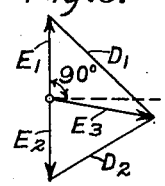
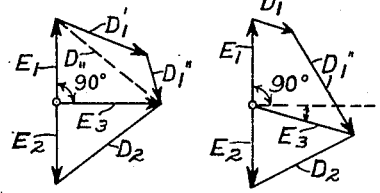
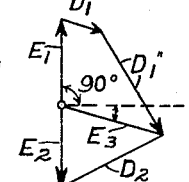
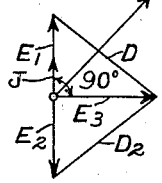
WITNESSES:
R.S. Williams
F.E. Hardy
Inventors
Norbert Schachtmeyer
and Walter DeVries
BY
Eberley G. Carr
ATTORNEY Patented Apr. 16, 1929.

1,709,687

UNITED STATES PATENT OFFICE.

NORBERT SCHACHTMEYER, OF BERLIN, AND WALTER DE VRIES, OF BERLIN-CHARLOTTENBURG, GERMANY, ASSIGNORS TO WESTINGHOUSE ELECTRIC & MANUFACTURING COMPANY, A CORPORATION OF PENNSYLVANIA.

REGULATOR SYSTEM.

Application filed April 23, 1926, Serial No. 104,104, and in Germany August 13, 1925.

Our invention relates to regulator systems and particularly to means for governing the excitation of alternators or synchronous condensers that are connected to a power transmission system, for the purpose of maintaining the power-factor of the transmission system constant.

If a plurality of alternators are operated in parallel circuit relation to each other and connected to a transmission line, it is possible to vary the power-factor of the line by varying the excitation of one of the alternators. It is also possible to vary the power-factor at a point intermediate a generating station and a distribution center by connecting a synchronous condenser to the transmission line and regulating the excitation of the condenser to take a leading or a lagging current of varying intensity from the transmission line.

In accordance with one phase of our invention, we provide a regulator that is actuated by the differential action of two coils energized jointly by the line voltage and the line current. The two coils are provided with magnetic core members that are mechanically connected together. When the vector angle between the voltage and current varies from a predetermined value, the equilibrium of the two core members is disturbed, and a contact member is actuated thereby to engage one of a pair of auxiliary contact members, closing a circuit which effects an increase or a decrease in the excitation of the dynamo-electric machine being regulated.

The two regulating coils are connected in series-circuit relation with the secondary winding of a transformer that is energized in accordance with one characteristic of the transmission line, such as voltage. A reactance device, such as an indicator or condenser, is connected between the mid-point of the secondary winding of the transformer and the mid-point of the two regulator coils.

The reactance device is energized from a second transformer that is energized in accordance with a second characteristic of the transmission system, such as current. A similar result could be obtained by connecting the regulator coils in series with a current-transformer and energizing the reactance device from a voltage transformer. The above-described connections are sufficient in case it is desired that the regulator maintain unity power-factor.

According to another phase of our invention, we provide an adjustable ohmic resistance in the circuit of one or both of the regulating coils in the secondary circuit of the voltage transformer. A variation of the resistance of this circuit varies the power-factor at which a balanced pull exists between the regulator cores.

In accordance with a third phase of the invention, we provide means for increasing the sensitivity of the regulator when it is operating to maintain a power factor other than unity. When the resistance of the circuits energizing the regulator coils are unequal, as is necessary when regulating for other than unity power-factor, the vector voltage across the reactance device will be displaced from the vector voltages across the two halves of the voltage transformer an amount less than, or greater than, 90 degrees. The sensitivity of the regulator is a maximum when a 90 degree relation exists. We therefore provide a reactance device in the primary, or in the secondary, circuit of the voltage transformer which may be varied to produce the desired vector relation.

An object of our invention is, therefore, to provide a regulator that is controlled in accordance with the power-circuit conditions of a transmission line for governing the excitation of a dynamo-electric machine to maintain a predetermined power-factor on the transmission system.

Our invention will be better understood by reference to the accompanying drawings in which, Figure 1 is a diagrammatic view of circuits and apparatus embodying one form of our invention;

Fig. 2 illustrates one arrangement of circuits for actuating the regulator;

Fig. 3 illustrates a modified arrangement of apparatus and circuits for actuating the regulator; and Figures 4 to 8 are vector diagrams illustrating the operation of the regulator system under different conditions.

Referring to Fig. 1 of the drawings, a dynamo-electric machine 1 is provided, having an armature 2 that is connected to a three-phase transmission system 3, 4, 5, and having a field winding 6 that is connected through a rheostat 7 to an exciter generator 8. The rheostat 7 comprises a resistor 9 and a movable contact member 11 that is actuated by a pilot motor 12. The pilot motor 12 is provided with an armature winding 13 that is connected to a source of energy, such as a battery 14, and with differentially related series-field windings 15 and 16 that are energized, respectively, through one of the stationary contact members 17 and 18, and a movable contact member 19, which is actuated in accordance with the operation of the regulator 21.

The regulator 21 is provided with a pair of core members 22 and 23 that are mechanically connected by means of an arm 24, which is pivotally mounted at 25. The core members 22 and 23 are provided with windings 26 and 27, respectively, that are connected by means of conductors 28 and 29 to the secondary winding of a voltage transformer 30. The primary winding of the voltage transformer 30 is connected to power-circuit conductors 3 and 5. A reactor 31 is connected to a point 32 between the windings 26 and 27, and to a point 33, which is the mid-point of the secondary winding of the transformer 30. The two halves of the secondary winding of the transformer 30 are oppositely wound so as to produce voltages that are 180 degrees out of phase with each other.

The reactor 31 is connected by means of conductors 34 and 35 to a current transformer 36 that is connected to the line conductor 4.

Fig. 2 illustrates the arrangement of circuits as applied to a single-phase supply circuit, with the addition of condensers 37 and 38 that are connected in parallel circuit relation, respectively, to the regulator coils 26 and 27 and are for the purpose of overcoming the voltage drop in the reactor coil 31.

The operation of the regulator is best explained by referring to the vector diagram of Fig. 4. The assumption is made with respect to the several vector diagrams that the secondary voltage of the voltage transformer is in phase with the primary voltage, which is in phase with the line voltage, and that the secondary current of the current transformer is in phase with the line current.

It is assumed, in Fig. 4, that the $\cos \theta$ or power-factor, of the line is unity, where $\theta$ is the angle between the line voltage and line current. $E_1$ and $E_2$ in Fig. 4 indicate the equal but opposed voltages of the secondary windings of the voltage transformer, which are in phase with the primary voltage. When the value of $\cos \theta$ is unity, the current is in phase with the voltage. The reactor voltage $E_3$, which is set up mainly by the line currents, is at right angles to $E_1$ and $E_2$, and to obtain the voltages $D_1$ and $D_2$ for the regulator coils 26 and 27. The secondary current of the voltage transformer that is generated by the voltages $E_1$ and $E_2$ may be neglected as regards its effect on the voltage drop of the reactor 31, since the amount thereof may be made very small by the use of condensers 37 and 38, which are connected in parallel relation to the regulator coils 26 and 27, respectively. The voltages $D_1$ and $D_2$ are equal to each other and represent the condition wherein the contact member 19 will remain in its intermediate position between the stationary contact members 17 and 18.

Should the value of $\cos \theta$ vary from unity, the vector $E_3$ will move simultaneously with the vector of the line current, since the two are always at right angles to each other, and we obtain the diagram of Fig. 5, in which the voltages $D_1$ and $D_2$ are of unequal value, thus causing an unequal pull upon the core members 22 and 23. The core members are, therefore, actuated, thereby causing the contact member 19 to engage one of the contact members 17 or 18 to operate the pilot motor 12 and vary the resistance value of the rheostat 7 that is in circuit with the field winding 6 of the synchronous machine 1. The variation of the excitation will continue until $\cos \theta$ of the line has again reached the value of unity and we again have the condition represented by the diagram of Fig. 4.

In Fig. 3 variable resistors 39 and 41 are provided, respectively, in circuit with the regulator coils 26 and 27; and a reactor, which may be in the form of an inductor coil 42, is provided in the circuit of the primary winding of the voltage transformer 30. The reactor 31 and the current transformer 36 are also illustrated as being adjustable.

In accordance with a second aspect of the invention, an adjustable ohmic resistor 39 is provided in circuit with the regulator winding 26 and a similar resistor 41 may be provided in circuit with the regulator winding 27. The voltage conditions produced by inserting a resistor in circuit with one of the regulator windings are illustrated in the diagram of Fig. 6.

$E_1$ and $E_2$ again indicate the two equal voltages of the secondary winding of the voltage transformer and $E_3$ indicates the voltage of the reactor 31. Under the assumption that the ohmic resistor 39 is connected in the circuit of coil 26, the voltage acting on the coil 27 is equal to $D_2$, while $D_1$ indicates the resultant voltage of the ohmic drop $D_1'$ across the resistor 39 and the voltage $D_1''$ across the coil 26. We see, therefore, that the voltage equality of the coils 26 and 27 has been disturbed, so that the regulator will be actuated to vary the excitation of the dynamo-electric machine. The varying excitation of the dynamo-electric machine results in a change in $\cos \theta$ until the diagram of Fig. 6 becomes that of Fig. 7 or until the values of $D_1''$ and $D_2$ are again equal. The vector $E_3$ will now have assumed the position indicated in Fig. 7. It is apparent, therefore, that it is possible to maintain any desired value of $\cos \theta$ by varying the resistor 39.

The sensitivity of the regulator 21 is a maximum when the vector $E_3$ is at right angles to vectors $E_1$ and $E_2$, since under this condition the slightest variation from a 90 degree position will result in a comparatively large variation in the voltage of coil 26 with respect to that of coil 27. According to a third phase of the invention I provide an adjustable reactor, which may be an inductor coil or a condenser connected in the primary or secondary winding of the voltage transformer, such as the coil 42 illustrated in Fig. 3. By connecting the reactor 42 in the primary circuit of the voltage transformer 30, the primary voltage of the transformer 30 will have a phase displacement with respect to the line voltage. As illustrated in Fig. 8, $E_0$ indicates the line voltage, and J indicates the current vector which is displaced, relative to the line voltage. Adjustment of the reactor 14 may be made so as to bring the primary voltage of the voltage transformer in phase with the line current. In this case the voltage $E_3$ is again at right angles to $E_1$ and $E_2$ and we obtain a diagram similar to that of Fig. 4.

The sensitivity of the regulator depends upon the value of the voltage $E_3$. This voltage may be provided either by an inductor coil or by a condenser and may be adjusted by the use of an adjustable core or an adjustable condenser. The sensitivity of the regulator may be increased by providing taps on the secondary winding of the voltage transformer, as illustrated in Fig. 3; and, by utilizing a lesser number of secondary turns, it is possible to increase the current strength in the secondary of the transformer and thereby obtain a greater value of the voltage $E_3$ across the reactor 31.

Many modifications may be made in the circuits and apparatus illustrated without departing from the spirit of our invention, and we do not wish to be limited other than by the scope of the appended claims.

We claim as our invention:

1. In a power-factor regulator system, a dynamo-electric machine, means responsive to the power-factor of said system for controlling the excitation of said machine, said means comprising a pair of connected cores, a winding associated with each core, a transformer coil energized in accordance with the voltage of said system and connected in series circuit relation with said pair of windings, a conductor connected between said pair of windings and an intermediate point of said transformer coil, and means for introducing into said conductor a current that is proportional in value to the current of said system.

2. In a power-factor regulator system, a dynamo-electric machine, means responsive to the power-factor of said system for controlling the excitation of said machine, said means comprising a pair of connected cores, a circuit comprising a winding associated with each core, means for impressing upon the circuit of said windings a voltage that is substantially in phase with the voltage of said system, and means for impressing upon the circuit of said windings a voltage that is substantially in quadrature with the current of said system.

3. In a power-factor regulator system, a dynamo-electric machine, means responsive to the power-factor of said system for controlling the excitation of said machine, said means comprising a pair of connected cores and a winding associated with each core, means for impressing upon said windings a voltage that is substantially in phase with the voltage of said system, and means for impressing upon said windings a voltage that is substantially in quadrature with the current of said system.

4. In a power-factor regulator system, a dynamo-electric machine, means responsive to the power-factor of said system for controlling the excitation of said machine, said means comprising a pair of connected cores and a winding associated with each core, a source of voltage that is substantially in phase with the voltage of said system, a source of voltage that is substantially in quadrature with the current of said system, and means for so impressing each of said two sources of voltage upon said pair of windings that the algebraic sum of the voltages impressed upon one winding increases and the algebraic sum of the voltages impressed upon the other winding decreases upon a variation of the power-factor of said system from a predetermined value.

5. In a power-factor regulator system, a dynamo-electric machine, means responsive to the power-factor of said system for controlling the excitation of said machine, said means comprising a pair of connected cores and a winding associated with each core, a source of voltage that is substantially in phase with one characteristic of said system, a source of voltage that is substantially in quadrature with another characteristic of said system, means for connecting one of said sources in series circuit relation with said windings and means for connecting the other of said sources in parallel circuit relation to said windings.

6. In a power-factor regulator system, a dynamo-electric machine, means responsive to the power-factor of said system for controlling the excitation of said machine, said means comprising a pair of connected cores and a winding associated with each core, a transformer winding energized in accordance with one characteristic of said system and connected in series circuit relation with said core windings, a reactor connected from a point between said windings to a point intermediate the ends of said transformer windings, and a second transformer winding energized in accordance with a characteristic of said system and connected to the terminals of said reactor.

7. In a power-factor regulator system, a dynamo-electric machine, means responsive to the power-factor of said system for controlling the excitation of said machine, said means comprising a pair of connected cores and a winding associated with each core, a reactor, two sources of voltage that vary in accordance with different characteristics of said system, said windings being connected in series circuit relation with one of said sources, and said reactor and said windings being connected in parallel circuit relation to one another and to the other of said sources.

8. In a power-factor regulator system, a dynamo-electric machine, means responsive to the power-factor of said system for controlling the excitation of said machine, said means comprising a pair of connected cores and a winding associated with each core, and two sources of voltage that vary in accordance with two different characteristics of said system, said windings being connected in series circuit relation with one of said sources, and in parallel circuit relation to the other of said sources.

In testimony whereof, we have hereunto subscribed our names this 1st day of April, 1926.

NORBERT SCHACHTMEYER.
WALTER DE VRIES.